United States Patent Office 3,232,981
Patented Feb. 1, 1966

---

3,232,981
BENZENE SULFONYL UREA COMPOUNDS AND PROCESS OF MAKING SAME
Erich Haack, Heidelberg, and Ruth Heerdt and Felix H. Schmidt, Mannheim, Germany, assignors to C. F. Boehringer & Soehne G.m.b.H., Mannheim-Waldhof, Germany, a corporation of Germany
No Drawing. Filed Aug. 7, 1961, Ser. No. 129,563
Claims priority, application Germany, Aug. 20, 1960, B 59,050
11 Claims. (Cl. 260—553)

The present invention relates to new and valuable antidiabetic benzene sulfonyl urea compounds and more particularly to such benzene sulfonyl urea compounds which, on oral administration, are effective antidiabetic agents, and to a process of making same.

It is known that certain benzene sulfonyl urea compounds have blood sugar decreasing properties and can be used as orally effective antidiabetic agents. More particularly $N_1$-sulfanilyl-$N_2$-(n-butyl) urea and $N_1$-(4-methyl benzene sulfonyl)-$N_2$-(n-butyl) urea have proved to be of considerable value in diabetes therapy.

Antidiabetic benzene sulfonyl urea compounds which carry at their $N_2$-atom an open chain or cyclic hydrocarbon residue containing hetero atoms in its chain or ring have also become known. Such compounds contain, for instance, an alkoxy alkyl group attached to the $N_2$-atom. Compounds of this type have a considerably reduced toxicity in comparison with analogous compounds which do not contain such hetero atoms. However, their antidiabetic activity is also reduced.

It is one object of the present invention to provide new and valuable benzene sulfonyl urea compounds which are substituted at the $N_2$-atom by a cycloalkyl radical connected with an alkyl radical by a hetero atom, for instance, by a cyclohexyl radical substituted by a lower alkoxy group. Such compounds have not only a high antidiabetic activity but also a surprisingly low toxicity, and thus are of excellent therapeutic usefulness.

Another object of the present invention is to provide a simple and effective process of producing such new and valuable benzene sulfonyl urea compounds.

Other objects of the present invention and advantageous features thereof, will become apparent as the description proceeds.

In principle, the compounds according to the present invention correspond to the following Formula I:

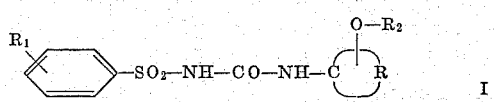

wherein:

$R_1$ indicates hydrogen, halogen, a lower alkyl radical, a lower alkoxy group, and a substituted lower alkyl radical, preferably a halogen substituted lower alkyl radical;
$R_2$ indicates a lower alkyl radical; and $C \quad R$ indicates a cycloalkyl radical.

Preferred compounds according to the present invention are compounds of the following Formula II:

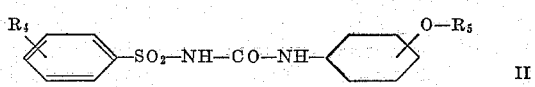

wherein:

$R_4$ indicates the methyl radical, halogen, or the methoxy group while
$R_5$ indicates the methoxy group or the ethoxy group.

The compounds of Formula I are obtained according to methods as they are known for preparing substituted urea compounds. The preferred method consists in reacting a benzene sulfonyl compound of Formula III

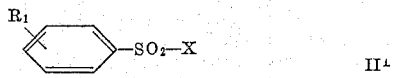

with a cycloalkyl compound of Formula IV

wherein:

$R_1$ represents the same substituents as indicated above,
W indicates an alkoxy group or a group convertible into an alkoxy group, and one of the substituents
X and Y represents an amino group while the other indicates an isocyanate group or a group which is converted under the reaction conditions into the isocyanate group.

If necessary, the substituent W, if it is a group convertible into an alkoxy group is then converted into such a group.

For instance, the corresponding sulfonamide of Formula III is condensed, preferably in the form of its sodium or potassium salt, with an alkoxy cycloalkyl isocyanate, or, this reaction is reversed and the corresponding sulfonyl isocyanate of Formula III is reacted with an alkoxy cycloalkyl amine.

In place of the isocyanate, there may be used compounds which, under the reaction conditions, are capable of forming isocyanic acid esters. Suitable isocyanate-forming compounds are, for instance, carbamic acid halogenides, urethanes, thio-urethanes, urea compounds, and their acyl derivates.

According to another embodiment of the present invention, it is also possible to convert benzene sulfonyl thio-urea compounds, guanidines or iso-urea ethers of Formula V

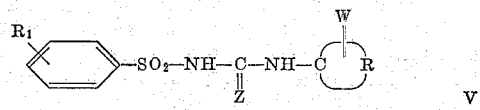

wherein:

$R_1$, W, and $C \quad R$ represent the same substituents as indicated above, while Z indicates sulfur or the imino group or, respectively, compounds of Formula VI

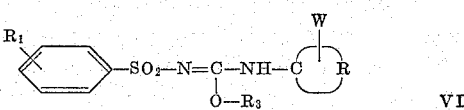

wherein:

$R_1$, W, and $C \quad R$ represent the same substituents as indicated above, while $R_3$ is a lower alkyl radical, by suitable hydroytic agents into the corresponding benzene sulfonyl urea compounds of Formula I in which, if required, the substituent W is converted into the alkoxy group.

Conversion of the sulfonyl guanidines of Formula V is preferably effected by alkaline hydrolysis, for instance, by means of alkali metal hydroxides; conversion of the iso-urea alkyl ethers by acid hydrolysis, for instances, by means of hydrogen halide; and conversion of the thiourea compounds by oxidative hydrolysis, for instance, by means of nitrous acid.

The following examples serve to illustrate the present invention without, however, limiting the same thereto.

EXAMPLE 1

$N_1$-(p-toluene sulfonyl)-$N_2$-(4-methoxy cyclohexyl) urea 45.8 g. of p-toluene sulfonyl methyl urethane are dissolved in 45 cc. of dimethyl formamide—25.8 g. of 4-methoxy cyclohexylamine are added thereto. The mixture is heated at 110° C. for 3 hours while stirring whereby the methanol which is split off during the reaction is distilled off in a vacuum. At the beginning of the reaction a low vacuum is applied while at the end of the reaction the pressure is reduced to 20 mm./Hg. The reaction mixture is then diluted with water and the precipitated $N_1$-(p-toluene sulfonyl)-2-(4-methoxy cyclohexyl) urea is filtered off by suction. It is purified by redissolving it in dilute sodium carbonate solution and reprecipitating it by the addition of dilute acetic acid. Its melting point is 184–185° C. Yield: 82% of the theoretical yield.

The following compounds are prepared in an analogous manner by using the corresponding sulfonyl methyl urethanes and cyclohexyl amino compounds in place of p-toluene sulfonyl methyl urethane and 4-methoxy cyclohexylamine, while otherwise the procedure is the same as described hereinabove.

EXAMPLE 2

By reacting o-toluene sulfonyl methyl urethane with 4-methoxy cyclohexylamine, there is obtained $N_1$-(o-toluene sulfonyl)-$N_2$-(4-methoxy cyclohexyl) urea of the melting point 182–185° C. Yield: 80% of the theoretical yield.

EXAMPLE 3

By reacting p-toluene sulfony methyl urethane with 2-methoxy cyclohexylamine, there is obtained $N_1$-(p-toluene sulfonyl)-$N_2$-(2-methoxy cyclohexyl) urea of the melting point 135–137° C. Yield: 78% of the theoretical yield.

EXAMPLE 4

By reacting o-toluene sulfonyl methyl urethane with 2-methoxy cyclohexylamine, there is obtained $N_1$-(o-toluene sulfonyl)-$N_2$-(2-methoxy cyclohexyl) urea of the melting point 140–142° C. Yield: 70% of the theoretical yield.

EXAMPLE 5

By reacting p-chlorobenzene sulfonyl methyl urethane with 4-methoxy cyclohexylamine, there is obtained $N_1$-(p-chloro benzene sulfonyl)-$N_2$-(4-methoxy cyclohexyl) urea of the melting point 158–160° C. Yield: 80% of the theoretical yield.

EXAMPLE 6

By reacting benzene sulfonyl methyl urethane with 4-methoxy cyclohexylamine, there is obtained $N_1$-(benzene sulfonyl)-$N_2$-(4-methoxy cyclohexyl) urea of the melting point 165–168° C. Yield: 85% of the theoretical yield.

EXAMPLE 7

By reacting p-methoxy benzene sulfonyl methyl urethane with 4-methoxy cyclohexylamine, there is obtained $N_1$-(p-methoxy benzene sulfonyl)-$N_2$-(4-methoxy cyclohexyl) urea of the melting point 152–155° C. Yield: 70% of the theoretical yield.

EXAMPLE 8

By reacting o-toluene sulfonyl methyl urethane with 4-ethoxy cyclohexylamine, there is obtained $N_1$-(o-toluene sulfonyl)-$N_2$-(4-ethoxy cyclohexyl) urea of the melting point 160–163° C. Yield: 63% of the theoretical yield.

EXAMPLE 9

By reacting p-toluene sulfonyl methyl urethane with 4-ethoxy cyclohexylamine, there is obtained $N_1$-(p-toluene sulfonyl)-$N_2$-(4-ethoxy cyclohexyl) urea of the melting point 172–176° C. Yield: 68% of the theoretical yield.

EXAMPLE 10

By reacting p-chloro benzene sulfonyl methyl urethane with 4-ethoxy cyclohexylamine, there is obtained $N_1$-(p-chloro benzene sulfonyl)-$N_2$-(4-ethoxy cyclohexyl) urea of the melting point 162–163° C. Yield: 60% of the theoretical yield.

EXAMPLE 11

By reacting p-chloro benzene sulfonyl methyl urethane with 2-methoxy cyclohexylamine, there is obtained $N_1$-(p-chloro benzene sulfonyl)-$N_2$-(2-methoxy cyclohexyl) urea of the melting point 138–140° C. Yield: 72% of the theoretical yield.

EXAMPLE 12

By reacting p-trifluoro methyl benzene methyl urethane with 4-methoxy cyclohexylamine, there is obtained $N_1$-(p-trifluoro methyl benzene sulfonyl)-$N_2$-(4-methoxy cyclohexyl) urea of the melting point 150–152° C. Yield: 61% of the theoretical yield.

The compounds according to the present invention have very high antidiabetic activity and a surprisingly low toxicity. Therefore, the therapeutic range of these compounds is much wider than that of all other sulfonylureas. These advantageous properties are due to the fact that the new compounds are specifically metabolized in the human body.

The compound of Example 1, i.e., $N_1$-(p-toluene sulfonyl)-$N_2$-(4-methoxy cyclohexyl) urea has proved of special value in diabetes therapy. It is a white, crystalline substance of indefinite taste. It is only slightly soluble in water but readily soluble in acetone and ethanol. It forms readily soluble salts by reaction with alkali metal hydroxides. Its solubility in 100 cc. of water at 37° C. and a pH of 5.4 is 15.5 mg. while at a pH of 7.0 it is 415 mg. Its acute toxicity, determined 24 hours after subcutaneous administration as $LD_{50}$ in white mice, is 2.13 g./kg.

When administering the compound to rabbits which had not been fed for 16 hours, intravenously and orally in the form of a suspension, it was found that 5 mg./kg. significantly decrease the blood sugar. On intravenous administration the well known sulfanilyl-n-butyl urea compound requires 40 times that amount to produce the same reduction in blood sugar, namely 200 mg./kg. On oral administration, the new compound is about 100 times as effective as the known sulfanilyl-n-butyl urea, i.e., 5 mg./kg. of the compound of Example 1 are effective while of the known compound 500 mg./kg. are required. The amounts administered in these animal experiments were tolerated on intravenous application up to amounts of 1 g./kg. without any side-effects. The most pronounced blood sugar decreasing effects are observed on administration of amounts between 10 mg./kg. and 100 mg./kg. When administrating 500 mg./kg. or, respectively, 1000 mg./kg. moderate initial hyperglycemia was observed which, however, reverted into prolonged hypoglycemia after three to four hours. The blood sugar is decreased for more than 7 hours when administering a dose of at least 10 mg./kg. Administration of 5 mg./kg. produces a blood sugar decrease of a slightly shorter duration.

Oral administration causes a prolonged decrease in blood sugar when administering 5 mg./kg. to 2000 mg./kg. Even such high dosages as 2000 mg./kg. do not produce hyperglycemia by stimulation. The most pronounced blood sugar reducing effects are observed on administration of amounts between about 25 mg./kg. and 100 mg./kg.

Intravenous administration of 10 mg./kg. to rats causes merely a slight decrease in the blood sugar of short duration. However, on intravenous administration of 25 mg./kg., pronounced hypoglycemia was observed. When orally administering 10 mg./kg. hypoglycemic effects were observed for 2 to 3 hours only. The blood sugar is reduced very considerably to values of 20 mg. percent within the first hour. Prolonged hypoglycemia is caused by oral administration of 100 mg./kg.

20 mg./kg. of the compound of Example 1 administered orally to dogs produce a decrease in blood sugar of about 30% whereby the optimum effect is observed after about 2 hours. The resulting hypoglycemia has disappeared after about 6 hours.

Tests with healthy persons showed on oral administration of 50 mg. a slight decrease in blood sugar of about 16% to 20% which ceased after about 3 hours. Oral administration of 150 mg. per person produced in four healthy persons a prolonged decrease in blood sugar of at least 30%. Oral administration of 200 mg. per person produced the strongest effect which, after about 1 to 2 hours, amounts to a blood sugar decrease of about 40%. All these doses of the compound of Example 1 were tolerated by the test persons without any side-effects. A few persons experienced the sensation of hunger as a result of the rapid onset of the hypoglycemia.

Treatment of three diabetic persons with daily doses of 200 mg. of the compound of Example 1 had the following results. A blood sugar decrease from 187 mg. percent to 126 mg. percent was observed in one patient 4 hours after administration. The blood sugar values remained at about the same level during the next 24 hours even after partaking of substantial meals. With a second patient optimum effects were observed 6 hours after administration. A pronounced blood sugar decrease was caused with a third patient 4 hours after administration whereby the blood sugar value after partaking of the dinner meal corresponded to the blood sugar level on fasting.

Two hours after administration it was possible to determine the presence of the antidiabetic agent in the blood serum. The highest blood serum level amounted to about 2.5 mg. percent. Eight hours to nine hours after administration less than 1 mg. percent could be detected in the blood serum. The half-level period was between 2 hours and 3½ hours.

Similar results on animals and diabetic persons where observed when administering the compounds of Examples 5, 9 and 10, while the other compounds were somewhat less effective. The following table illustrates the hypoglycemic activity as well as the toxicity of some of the new compounds according to the present invention.

TABLE

| Compound Example No. | Toxiciy LD$_{50}$ subcutaneous in mice, g./kg. | Blood sugar decreasing effect— | | | |
|---|---|---|---|---|---|
| | | Caused by x mg./kg. rabbits | | x times higher than that of compound A [1] | |
| | | Orally [2] | I.V. [2] | Orally | I.V. |
| 1 | 2.13 | 5 | 5 | 100 | 40 |
| 5 | 1.3 | 5 | 2.5 | 100 | 80 |
| 7 | 0.88 | 20 | 7.5 | 25 | 26 |
| 8 | 1.65 | 20 | 10 | 25 | 20 |
| 9 | 1.7 | 10 | 5 | 50 | 40 |
| 10 | 0.98 | 10 | 5 | 50 | 40 |

[1] Compound A: Sulfanilyl-n-butyl urea.  [2] Administration.

Preferably the compounds of the above given Formula I are administered orally in a pharmaceutical carrier in standard form as tablets, pills, lozenges, dragees, and the like shaped and/or compressed preparations. It is also possible to produce emulsions or suspensions of said compounds in water or aqueous media such as unsweetened fruit juices and by means of suitable emulsifying or dispersing agents. The new antidiabetic agents may furthermore be employed in the form of powders filled into gelatin capsules or the like.

Such powders and mixtures to be used in the preparation of tablets and other shaped and/or compressed preparations may be diluted by mixing and milling with a solid pulverulent extending agent to the desired degree of fineness or by impregnating the already milled, finely powdered, solid carrier with a suspension of said compounds in water or with a solution thereof in an organic solvent such as ethanol, methanol, acetone, and others and then removing the water or solvent.

When preparing tablets, pills, dragees, and the like shaped and/or compressed preparations, the commonly used diluting, binding, and disintegrating agents, lubricants, and other tableting adjuvants are employed, provided they are compatible with said sulfonyl urea compounds. Such diluting agents and other excipients are, for instance, sugar, lactose, levulose, starch, bolusalba, as disintegrating and binding agents, gelatin, gum arabic, yeast extract, agar, tragacanth, methyl cellulose, pectin, and, as lubricants, stearic acid, talc, magnesium stearate, and others.

It is, of course, also possible to administer the new compounds in the form of suppositories whereby the commonly used suppository vehicles, such as cocoa butter, are used.

The amounts of said new sulfonyl urea compounds according to the present invention in antidiabetic pharmaceutical units or dosage according to the present invention may be varied. It is also possible to administer several unit dosage forms at the same time.

The following examples of compositions containing the new sulfonyl urea compounds as they are to be used in diabetes therapy serve to illustrate the present invention without, however, limiting the same thereto.

EXAMPLE 13

10.0 kg. of $N_1$-(p-toluene sulfonyl)-N-(4-methoxy cyclohexyl) urea are moistened with 3500 cc. of a 1% gelatin solution and are kneaded in a kneader until its initial crystal structure has disappeared. The resulting mixture is granulated and is dried in an air current at about 40° C. 10.350 kg. of granulate are obtained thereby. This granulate is intimately mixed, in a mixing apparatus, with 1550 g. of corn starch and 100 g. of magnesium stearate and compressed by means of a revolving tableting press to tablets having a diameter of 13 mm. and a weight of 0.6 g. Each tablet contains about 0.5 g. of $N_1$-(p-toluene sulfonyl)-$N_2$-(4-methoxy cyclohexyl) urea.

EXAMPLE 14

10 kg. of $N_1$-(p-chloro benzene sulfonyl)-$N_2$-(4-methoxy cyclohexyl) urea are intimately kneaded with 2700 cc. of distilled water and 180 g. of anhydrous chemically pure sodium carbonate in a kneader for one hour. Thereby the sodium salt of said sulfonyl urea compound is formed in an amount of about 10% thereof. The mixture is granulated and is dried in an air current at 40° C. The granulate which amounts to 10.1 kg. is intimately mixed with 1100 g. of a special magnesium aluminum silicate and 100 g. of magnesium stearate. The mixture is compressed into tablets, each weighing 0.452 g. Each tablet contains 0.4 g. of $N_1$-(p-chloro benzene sulfonyl)-$N_2$-(4-methoxy cyclohexyl) urea.

EXAMPLE 15

Cores of dragees with convex surfaces composed of 0.25 g. of $N_1$-(4-methoxy benzene sulfonyl)-$N_2$-(4-methoxy cyclohexyl) urea and of 0.0325 g. of potato starch containing 10% of stearic acid are prepared by compressing such a mixture. Said cores are coated in a dragee-coating vessel by means of sugar sirup and talcum. The last dragee coating contains aromatic, sweetening, and coloring agents and is polished and, if desired, provided with a thin metal foil layer.

EXAMPLE 16

The potassium salt of $N_1$-(p-toluene sulfonyl)-$N_2$-(4-methoxy cyclohexyl) urea is intimately kneaded in finely pulverized state with an aqueous 2% methyl cellulose solution in an amount sufficient to produce a viscous paste. The kneaded mixture is granulated and dried. 8% of starch, calculated for the weight of the potassium salt, and 0.2% of a lubricant are admixed thereto. Semi-circular cores of dragees which contain 0.3 g. of $N_1$-(p-toluene sulfonyl)-$N_2$-(4-methoxy cyclohexyl) urea (calculated as the free compound) are pressed therefrom. Said cores are worked up to substantially round dragees.

EXAMPLE 17

0.25 g. of pulverized $N_1$-(p-toluene sulfonyl)-$N_2$-(4-ethoxy cyclohexyl) urea are filled into one-half of a gelatin capsule and the other half of said capsule is fitted thereover. Both halves are then united and sealed to form a gelatin capsule.

EXAMPLE 18

10 kg. of $N_1$-(p-chloro benzene sulfonyl)-$N_2$-(4-ethoxy cyclohexyl) urea are finely pulverized and are mixed in a kneading device with a vegetable or suitable mineral oil in an amount sufficient to produce a suspension which is fluid and can be ejected through a canula. Said suspension is injected by means of a suitable machine, in a predetermined dosage between two plastic gelatin foils and the foils are seamlessly welded with each other. The resulting capsule is completely filled with the sulfonyl urea compound, for instance, in an amount of 0.3 g. per capsule. The foils or the oil can be dyed, rendered opaque, or can otherwise be rendered distinctive.

In the same manner a suitable salt of said sulfonyl urea compound, for instance, the sodium, potassium, calcium, magnesium, ammonium salt, and others, are filled into such capsules whereby the amount of said materials is adjusted so that each capsule contains 0.25 g. calculated for free sulfonyl urea compound.

EXAMPLE 19

10 kg. of $N_1$-(p-toluene sulfonyl)-$N_2$-(4-methoxy cyclohexyl) urea are mixed in a kneader with 2.5 kg. of starch and 1.38 kg. of lactose. This mixture is then further kneaded with a mucilage made from 4 liters of water and 120 g. of gum tragacanth. The resulting moist material is passed through an extrusion press and then through a pill making machine which gives moist pills each weighing 0.18 g.

The moisture is removed by drying in a suitable dryer. The resulting pills weigh 0.14 g. and contain about 0.1 g. of the active sulfonyl urea compound.

In the place of gum tragacanth, there may be employed other binding materials such as methyl cellulose, gum arabic, or magnesium aluminum silicate. It is also possible, by employing different rollers in the pill making machine, to produce pills having a higher content of active sulfonyl urea compound.

EXAMPLE 20

A 10% suspension of finely pulverized $N_1$-(p-chloro benzene sulfonyl)-$N_2$-(4-methoxy cyclohexyl) urea in an aqueous 20% sugar solution is prepared. The sugar solution contains methyl cellulose in an amount sufficient to produce a viscous suspension. Aromatic substances such as oil of cinnamon, aniseed oil, vanillin, or vanilla extract and, if desired, dyestuffs, are added to said suspension which is then filled into bottles or tubes. 10 cc. of such a suspension contain about 1 g. of $N_1$-(p-chloro benzene sulfonyl)-$N_2$-(4-methoxy cyclohexyl) urea.

In place of a 20% sugar solution, there can be used a 50% levulose solution whereby the amount of the sulfonyl urea compound according to the present invention can be increased to 15%. It is, of course, also possible to prepare suspensions of this type which contain only 5% of the sulfonyl urea compound. The sugar may be completely omitted and/or in its place there may be used suitable fruit juices such as orange juice, grapefruit juice, tomato juice or the like. As thickening agent there may be used a suitable magnesium aluminum silicate instead of methyl cellulose.

EXAMPLE 21

Finely pulverized $N_1$-(p-toluene sulfonyl)-$N_2$-(4-ethoxy cyclohexyl) urea is intimately mixed with a molten suppository vehicle of a fatty acid ester base or of a polyethylene glycol base. The mixture is poured into a suppository mold. The resulting suppositories contain about 1.0 g. of the sulfonyl urea compound.

The blood sugar lowering substituted sulfonyl urea compounds according to the present invention are capable of forming alkali metal, alkaline earth metal, and ammonium salts, and especially potassium, sodium, and magnesium metal salts, as well as salts with various organic amines which are compatible to the human system. Some of said salts are of considerable importance in view of their high water solubility. For instance, the sodium and magnesium metal salts are readily soluble in water so that injectable aqueous solutions can be prepared. Such solutions can be used in cases where intravenous administration is desired. The dosage is about the same as on oral administration.

Such salts are prepared in the usual manner, for instance, by adding a metal hydroxide to the sulfonyl urea compounds as such urea compounds are relatively strong acids. It is also possible to produce salts with organic bases which are compatible to the human system in the amounts administered.

The salts set forth herein are useful in the treatment of diabetes in like manner as the compounds set forth herein, administered in the same dosage and in the time sequence as said compounds.

As already mentioned, the new compounds are specifically metabolized in the human body. The ether group of the alkoxy cycloalkyl residue is split up, most likely by the enzyme alkyl transferase. The result of this process are the corresponding hydroxy cycloalkyl compounds which can be identified in the urine. When compared with the original compounds, the metabolites show a decreased antidiabetic activity. They are highly soluble, so that there is no danger of crystalluria.

Such a metabolic pathway is unique for these compounds and differs from those of other sulfonylureas. The surprisingly low order of toxicity of our new compounds is best explained by this new metabolic pathway.

We claim:
1. $N_1$-(p-toluene sulfonyl)-$N_2$-(4-methoxy cyclohexyl) urea.
2. $N_1$-(p-toluene sulfonyl)-$N_2$-(4-ethoxy cyclohexyl) urea.
3. $N_1$-(p-toluene sulfonyl)-$N_2$-(4-lower alkoxy cyclohexyl) urea.
4. $N_1$-(p-chloro benzene sulfonyl)-$N_2$-(4-methoxy cyclohexyl) urea.
5. $N_1$-(p-chloro benzene sulfonyl)-$N_2$-(4-ethoxy cyclohexyl) urea.
6. $N_1$-(p-chloro benzene sulfonyl)-$N_2$-(4-lower alkoxy cyclohexyl) urea.
7. $N_1$-(p-methoxy benzene sulfonyl)-$N_2$-(4-methoxy cyclohexyl) urea.
8. $N_1$-(p-lower alkoxy benzene sulfonyl)-$N_2$-(4-lower alkoxy cyclohexyl) urea.
9. The sulfonyl urea compound selected from the group consisting of the $N_1$-(substituted benzene sulfonyl)-$N_2$-(alkoxy substituted cyclohexyl) urea compound of the formula

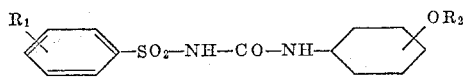

wherein:

R$_1$ indicates a member selected from the group consisting of hydrogen, halogen, lower alkyl, and lower alkoxy and R$_2$ indicates a lower alkyl and its salts with pharmaceutically acceptable bases.

10. N$_1$-(o-toluene sulfonyl)-N$_2$-(4-ethoxy cyclohexyl) urea.

11. N$_1$-(p-trifluoro methyl benzene sulfonyl)-N$_2$-(4-methoxy cyclohexyl) urea.

References Cited by the Examiner

UNITED STATES PATENTS

| | | | |
|---|---|---|---|
| 2,953,578 | 9/1960 | Haack et al. | 260—553 |
| 2,968,158 | 1/1961 | Ruschig et al. | 167—55 |
| 3,005,022 | 10/1961 | McLamore et al. | 260—553 |

OTHER REFERENCES

German patent (Auslegeschrift) 1,003,716, Mar. 7, 1957.

Yale et al.: J. Org. Chem., vol. 25, pages 1824 to 1827.

Yale: J. Med. and Pharm. Chem., vol. 1, No. 2, pp. 121–133 (1959).

WALTER A. MODANCE, *Primary Examiner.*

IRVING MARCUS, *Examiner.*

E. E. BERG, JOHN D. RANDOLPH,
*Assistant Examiners.*